(12) United States Patent
Berard

(10) Patent No.: US 9,164,663 B1
(45) Date of Patent: Oct. 20, 2015

(54) MONITORING AND REPORTING SYSTEM FOR AN ELECTRIC POWER DISTRIBUTION AND/OR COLLECTION SYSTEM

(71) Applicant: Clement A. Berard, Pennington, NJ (US)

(72) Inventor: Clement A. Berard, Pennington, NJ (US)

(*) Notice: Subject to any disclaimer, the term of this patent is extended or adjusted under 35 U.S.C. 154(b) by 162 days.

(21) Appl. No.: 13/761,654

(22) Filed: Feb. 7, 2013

Related U.S. Application Data

(60) Provisional application No. 61/596,982, filed on Feb. 9, 2012.

(51) Int. Cl.
G06F 3/0484 (2013.01)

(52) U.S. Cl.
CPC .................................. *G06F 3/0484* (2013.01)

(58) Field of Classification Search
USPC ........................................................ 715/772
See application file for complete search history.

(56) References Cited

U.S. PATENT DOCUMENTS

| 7,346,433 B2* | 3/2008 | Budike, Jr. ..................... 700/277 |
| 2005/0279169 A1* | 12/2005 | Lander ............................. 73/592 |
| 2011/0004446 A1* | 1/2011 | Dorn et al. ..................... 702/188 |

OTHER PUBLICATIONS

First Energy Corp., "Outage Help-24-7 Power Center", printed May 6, 2013, 6 pages, https://www.firstegergycorp.com.

* cited by examiner

*Primary Examiner* — Peiyong Weng
(74) *Attorney, Agent, or Firm* — Clement A. Berard, Esq.; Dann, Dorfman, Herrell & Skillman, PC

(57) ABSTRACT

A system and method for displaying a representation of the configuration of a distribution and/or collection system and the operating status thereof, may comprise: a computer receiving an access request; a storage device storing a representation of the elements and configuration of the distribution and/or collection system and storing information relating to the operating state of the elements; wherein the computer generates a displayable representation of the elements and configuration of the distribution and/or collection system in accordance with the operating state of the elements; and a communication port for transmitting the transformed displayable representation of the elements and configuration of the system to a display.

15 Claims, 6 Drawing Sheets

MONITORING AND REPORTING SYSTEM FOR AN ELECTRIC POWER DISTRIBUTION AND/OR COLLECTION SYSTEM

This Application claims the benefit of U.S. Provisional Patent Application No. 61/596,982 entitled "MONITORING AND REPORTING SYSTEM FOR AN ELECTRIC POWER DISTRIBUTION AND/OR COLLECTION SYSTEM" filed on Feb. 9, 2012, which is hereby incorporated herein by reference in its entirety.

The present invention relates to a distribution and/or collection system and method and, in particular, to a monitoring and reporting system and method therefor, of the sort that may be employed by electric power, water and other utilities.

This patent document contains material is subject to copyright protection. The copyright owner has no objection to the facsimile reproduction by anyone of the patent disclosure, as it appears in the patent files or records of the U.S. Patent and Trademark Office that are open to the public, but otherwise reserves all copyright rights whatsoever.

Distribution and collection systems, such as those for electrical power, telephone, communications, natural gas, water, sewage, waste removal and the like, all tend resemble a "tree-like" structure having a trunk, branches, twigs, etc. Presently, operators of such service systems may have computerized system maps that represent their distribution or collection systems for use by their employees, e.g., management, maintenance and repair personnel. These computerized representations may or may not be available to employees in the field, and even if they are, may not represent real time system status and operational information.

When a problem occurs, e.g., an outage or other disruption to or limitation of service, calls to a call center reporting loss or interruption of service, or another problem, populate a database that accumulates such data for use, e.g., in indicating the extent of the problem and for managing the response to such problem, such as prioritizing work and assigning and dispatching repair crews.

The operator may also provide limited information to customers and the public via an Internet web site regarding the problem, often by a diagram on a web site. In one known system, this diagram has an outline map of the region served, e.g., a part of a state, with colored circles of various sizes and colors indicating whether a particular area has or does not have a problem. Moving a cursor over a circle may open an information window that reports the number of customers suffering the problem. One example of such web page may be viewed at https://www.firstenergycorp.com/outages/outages.do?state_code=NJ.

The problem with such known systems is that the information represented by the circles is organized by political boundaries, e.g., by county, city or town, or by zip code, none of which is related to the organization of the distribution system, and so does not provide any information that is useful to the customer regarding his own problem. In fact, customers served by a single local distribution line may be in many different municipalities and/or zip codes which obscures and distorts what can be learned about the customer's situation, and further, customers in one city, town or zip code are served by different distribution lines which also obscures and distorts what can be learned about the customer's situation. Moreover, where the extent of the problem is larger so as to affect more and more customers, e.g., as after a severe weather event such as a hurricane or a snow and ice storm, the information that can gleaned from the available Internet web site becomes even less useful to the customers.

The present arrangement creates a risk to life, health and property because customers can not timely obtain information that realistically relates to their actual situation. For an electric power distribution system, for example, customers may have a critical need for accurate and timely information as to when service will be restored because, e.g., they rely upon electricity to operate medical devices and water well pumps and the like which are critical to health, cleanliness and waste disposal. This information is needed so that customers can make decisions as to whether to remain in their homes or businesses, or to relocate persons and spoilable goods, e.g., in refrigerators and freezers, to a safe location.

Moreover, modern communications devices have only a limited operating time on back-up power, e.g., from a battery, and so within hours of a loss of electrical power, other services such as telephone, cell phone towers, Internet connections and the like also become inoperative and so further isolate customers and increase the risk to life, health and property.

Applicant believes there is a need for a system monitoring and reporting system and method that not only provides useful information to those managing and servicing the system, but that also provides timely and useful information from which customers can understand and assess their own particular situation.

Accordingly, a system for displaying a representation of the configuration of a distribution and/or collection system and the operating status thereof, may comprise: a computer for receiving an access request; a storage device storing a representation of the elements and configuration of the distribution and/or collection system and storing information relating to the operating state of the elements; wherein the computer generates a displayable representation of the elements and configuration of the distribution and/or collection system in accordance with the operating state of the elements; and a communication port for transmitting the transformed displayable representation of the elements and configuration of the system to a display.

According to another aspect, a method for displaying a representation of the configuration of a distribution and/or collection system and the operating status thereof, may comprise:
  receiving an access request from a user;
  obtaining a representation of the elements and configuration of the distribution and/or collection system;
  providing the representation of the elements and configuration of the distribution and/or collection system for display on a display;
  storing information relating to the elements of and to the operating state of the elements of the distribution and/or collection system in a relational database;
  obtaining information representing the operating state of the elements of the distribution and/or collection system;
  modifying the representation of the elements and configuration of the distribution and/or collection system in accordance with the operating state of the elements of the distribution and/or collection system; and
  providing the modified representation of the elements and configuration of the distribution and/or collection system for display on a display.

According to a further aspect, a computer-readable storage medium encoded with computer instructions for displaying a representation of the configuration of a distribution and/or collection system and the operating status thereof, may comprise:

means for causing a computer to receive an access request from a user and if the access request is validated, then:

means for causing the computer to obtain a representation of the elements and configuration of the distribution and/or collection system;

means for causing the computer to provide the representation of the elements and configuration of the distribution and/or collection system for display on a display;

means for causing the computer to store information relating to the elements of the distribution and/or collection system and to the operating state of the elements of the distribution and/or collection system in a relational database;

means for causing the computer to obtain from the relational database information representing the operating state of the elements of the distribution and/or collection system;

means for causing the computer to modify the representation of the elements and configuration of the distribution and/or collection system in accordance with the database information to represent the operating state of the elements of the distribution and/or collection system; and means for causing the computer to provide the modified representation of the elements and configuration of the distribution and/or collection system for display on a display.

BRIEF DESCRIPTION OF THE DRAWING

The detailed description of the preferred embodiment(s) will be more easily and better understood when read in conjunction with the FIGURES of the Drawing which include.

Figure 1:
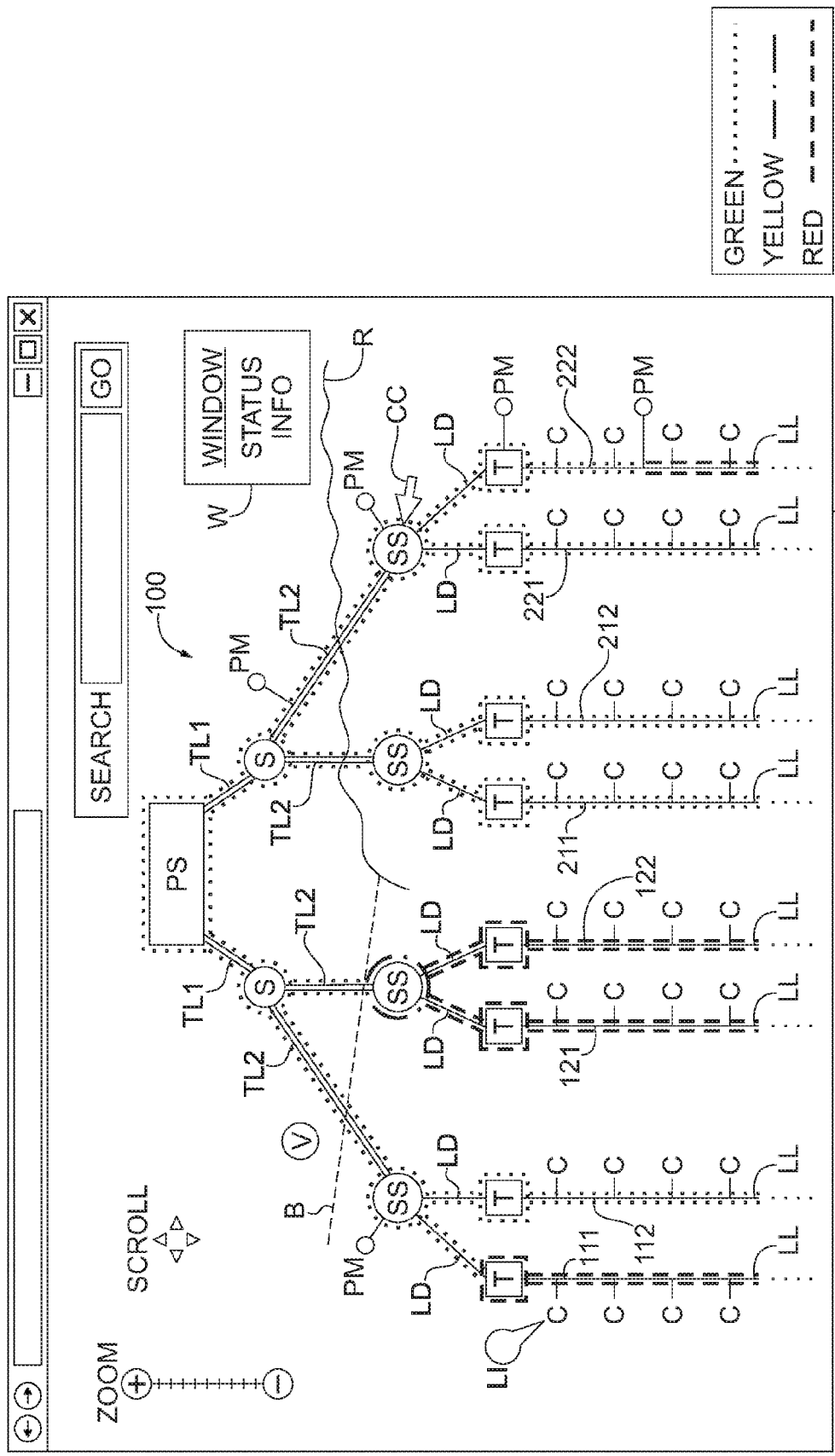
FIG. 1 is a schematic diagram of an example embodiment of an computer display of a web page reporting the configuration based operating status of a distribution or collection system.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. According to common practice, the various features of the drawing are not to scale, may be arbitrarily expanded or reduced for clarity, and are given by way of example only.

DESCRIPTION OF THE PREFERRED EMBODIMENT(S)

The monitoring and reporting system described herein may be employed in conjunction with a wide variety of distribution and collection systems, of which the most common include utilities such as electricity, telephone, cable TV, Internet, fiber optic, water, natural gas and the like, as well as collection utilities such as storm water, sewage, trash and the like. By way of example, the monitoring and reporting system is described herein in the context of an electric power distribution system without limiting of the applicability thereof to that particular system and to other systems.

FIG. 1 is a schematic diagram of an example embodiment of an computer display 200 of a web page reporting the configuration based operating status of a distribution or collection system 100. System 100 either produces or receives a utility, e.g., electric power, at a power source PS. Source PS may be one or more electrical power generating stations of any type and/or a connection to a power grid, as is known in the art. Electrical power from power source PS is distributed to stations S via transmission lines TL1 comprising plural electrical conductors most often carrying a high electrical voltage. These conductors may be carried by towers or maybe buried in the earth.

Power delivered by transmission lines TL1 is received at power stations S where it may be transformed to one or more different voltages and passed through protective devices and distribution apparatus to be further distributed by transmission lines TL2, usually at a lower electrical voltage, as is known in the art. Power station S may include transformers, fault interrupters and the like, and may be automated to operate without constant human attention, e.g., it may be monitored and operated by a remote computerized controller or by an on-site computerized controller, either with or without human intervention.

Power delivered by transmission lines TL2 is received at power substations SS where it may be transformed to one or more different voltages and passed through protective devices and distribution apparatus to be further distributed by local distribution lines LD to customers C, usually at a lower electrical voltage, as is known in the art. Power substation SS also may include transformers, fault interrupters and the like, and typically is operated unattended, e.g., it may be operated by a remote computerized controller or by an on-site computerized controller, possibly subject to human intervention from a remote location, if and when necessary.

Power distributed by local distribution lines LD may be at a voltage directly usable by customers C, and/or may be transformed to one or more different lower voltages by one or more transformers T. Transformers T and associated protective devices may be located on poles or pads as needed. Finally, power is distributed to individual customers C, e.g., businesses and residences, via local lines, usually at a lower electrical voltage, e.g., 220 volts, that can be directly utilized by customers C, as is known in the art.

System 100 is shown in simplified and generalized form; there may be and typically are more stations S and substations SS connected to transmission lines TL1, TL2, respectively, just as there are more transformers connected to local distribution lines LD.

Distribution system 100 typically includes monitoring devices PM that monitor the presence and levels of voltages at various points of system 100. Point monitoring devices PM may be relatively simple or relatively complex, depending upon what is to be monitored and to what extent. Where a relatively complex installation such as a station S or substation SS is to be monitored, devices PM typically monitor various pieces of apparatus thereat. For example, at a station S or substation SS, the voltage and current of each input transmission line may be monitored, as well as the operational status of each transformer, fault interrupter and the like.

At other locations, such as along transmission lines TL1, TL2 and distribution lines DL, at transformers T and on local lines LL, devices PM may simply monitor the presence of power (voltage) thereat.

Figure 2:
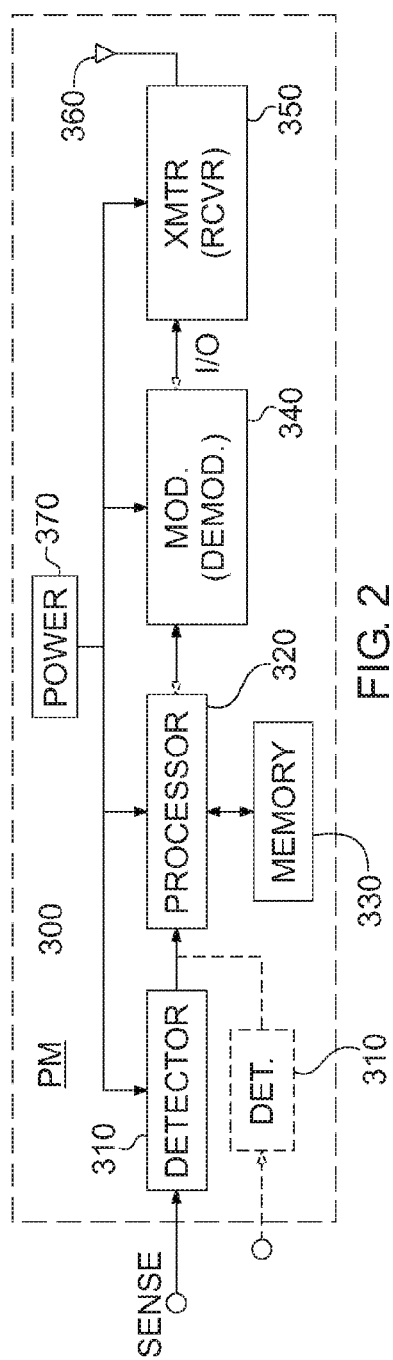
FIG. 2 is a schematic block diagram of an example embodiment of a point monitor device.

FIG. 2 is a schematic block diagram of an example embodiment of a point monitor device PM. Device PM may include circuitry 300 of varying complexity, depending upon the monitoring requirements. The parameter or parameters, e.g., voltage or voltages, of interest are sensed and applied to one or more detectors 310 and the outputs therefrom are applied to a processor 320. Detector 310 may be simply a level detector 310 indicating presence or absence of the monitored parameter, or may be a digital sensor 310 that produces an output representative of the value or other characteristic of the monitored parameter. Typically, modern higher level system elements such as power source PS, stations S and transmission lines TL1, TL2, are instrumented to monitor and report their operating conditions and status, and often to allow control of their operation from a remote location, and so already include a monitor PM or its equivalent, if not a more comprehensive monitoring and remote and/or automated control subsystem.

Processor 320 and memory 330 associated therewith may be a digital microprocessor or other relatively capable controller, or may simply pass along to modulator 340 an indication of the monitored parameter and an identifying value, e.g., a unique ID number, assigned to the device PM. The parameter representing information and the device PM identifier and modulated by modulator 340 and are communicated to a central system control location, e.g., via a transmitter 350 and antenna 360 operating in a radio link or via a cellular telephone or other network, or via a WiFi, Internet or other data network.

Preferably, the communication link between each device PM is independent of the presence or absence of electrical power from system 100 so that device PM can be operative and can communicate during outages. Device 30 may be powered by a battery 370 or other independent power source 370 at its location, however, such local power source 370 may be charged and maintained charged by power from system 100 and should be sized to operate device PM through the longest expected outage period, e.g., for 5-10 days or more.

In a simple example, monitoring device 310 may comprise a modulator 340 and transmitter 350 that periodically transmits its identifying number when it receives electrical power from system 100, so that it reports (transmits) periodically, e.g., every 1-5 minutes, if electrical power is present and does not report when there is a power outage.

In a more complex example, plural detectors 310 would include an analog to digital converter to produce digitized representations of the various voltages and currents present, and would periodically sample those parameters. Processor 320 would process such sampled representations and store them in memory 330, and would cause the data stored in memory 330, e.g., periodically and/or on command, to be produced, modulated 340 and transmitted 350. In such embodiment, modulator 340 would include a modulator 340 for modulating outgoing data and a demodulator 340 for demodulating incoming data, e.g., messages and commands. Likewise transmitter 350 would include a transmitter 350 for transmitting the modulated outgoing data and a receiver 350 for receiving the incoming data.

Returning to FIG. 1, system 100 is represented and displayed pictorially on a computer monitor 200. The representation may be generally accurate geographically in that the various elements of system 100 are overlaid on a geographic map of the region served by system 100 at or close to their actual locations, or the representation may be schematic and not be conformed to a geographical map. In either instance, the representation of system 100 on display monitor 200 conforms to the configuration of system 100, e.g., it is a "picture" of the system 100. This representation of the system 100 configuration may be built in a database or other computer file or files and represents the configuration of system 100 as it exists, and in the display 200 with at least all of its major elements represented. Where the display 200 conforms to a geographic area, display 200 includes one or more representations of a geographic location V, e.g., a village or city or town, a geographic feature R, e.g., a river or lake or ocean, and/or a political boundary B, e.g., a city, county, state or national border.

In addition, operational data and conditions pertaining to system 100 are also accumulated and recorded in one or more computer databases and are displayed, e.g., superimposed, on the system 100 representation on monitor 200 so as to transform the representation of system 100 thereon from its intended operating configuration and condition to its actual operating configuration condition and status, e.g., indicating faults, equipment failure, equipment taken off line for maintenance and repair, outages both local and widespread, and the like. In a preferred representation, colored highlights are superimposed on the elements of system 100 to indicate operating status, e.g., green highlighting for normal conditions and red highlighting for outage conditions. In addition yellow highlighting may be used for elements that are in the process of being repaired and restored to service. In the drawing, green highlighting is represented by a dotted line adjacent the displayed element of system 100, yellow highlighting is represented by a line of alternating dots and dashes adjacent the displayed element of system 100, and red highlighting is represented by a dashed line adjacent the displayed element of system 100, in accordance with the legend of FIG. 1.

In the illustrated example, the local circuits are numbered, e.g., as 111, 112, 121, 122, . . . , 222, by numbering the stations S, substations SS and transformers T from left to right. All of power source PS, stations SS and transmission lines TL1, TL2 are operating and so are highlighted in green in display 200. Substations SS, transformers T and local distribution lined LD and local lines LL serving circuits 112, 211, 212, 221 are operating normally, and so all are highlighted in green. At the left, the transformer T serving line LL of circuit 111 is out as is LL circuit 111 powered thereby, and so both are highlighted in red. The second substation SS from the right is undergoing repair and so is highlighted in yellow, and the local distribution lines LD, transformers T and local lines LL of circuits 121 and 122 are out, and so are highlighted in red. In the circuit 222 at the far right, transformer T and the part of circuit 222 between transformer T and a point monitor PM on LL circuit 222 are operating and are highlighted in green, however, the part of LL circuit 222 beyond point monitor PM is out, possibly based on outage reports from customers C connected to circuit 222, and are highlighted in red. Preferably, individual outage reports from customers C, which typically are received by an automated reporting system via telephone, are stored in the system 100 database and thus cause the drop of the affected customer to display red, e.g., as an outage, thereby making the outages immediately evident on the display 200 for system 100.

Thus, it is easy to see at a glance what the status of system 100 is by observing the displayed representation on monitor 200, and form that and information stored in various database records to prioritize repair and restoration, to assign and dispatch crews, and to monitor the progress towards restoration of full service. In a practical system 100, there may be many stations S, even more substations SS, possibly tens or hundreds, and a very large number of transformers T, perhaps hundreds or thousands, and even more local line LL circuits. Thus, a complete system display as illustrated would become unreadable at some level of detail at or below the substations SS. That effect is undesirable for both the operator of system 100 as well as for the customers C thereof.

Fortunately, display 200 is computer generated and can be manipulated to display data in various ways, and to provide different levels of detail to users of different authorization levels. For example, customers C need little access and information beyond how their circuit fares in the operational state of system 100 and information, if available, relating to projected restoration of service. Maintenance and repair crews in the field may require a greater level of access and detail as they seek to locate the actual faults and seek to repair equipment and restore service. Complete access and information should be available to system managers and supervisors, e.g., to those who are planning, directing and supervising the maintenance, repair and restoration efforts.

Display 200 provides several tools for use by the various users of display 200. For example, at the top of screen display 200 is a tool bar which may provide in typical WINDOWS® format forward and go back arrow buttons, a window displaying a URL address or other screen identifying information, and buttons for minimizing and maximizing the displayed size of screen 200, and an X button to close or exit the program. A task bar (not shown) may be provided at the bottom. Within display 200 are, e.g., a zoom tool, a scroll tool, a search tool and a detail data tool.

The ZOOM tool may be represented by a vertical bar-bell shaped icon having a "+" sign in a circle at one end and a "−" sign in a circle at the other end, and a graduated line therebetween, as is typically provided for displayed maps. By using the cursor CC to slide a marker along the line or to highlight and click on one of the circles, the display can be zoomed in and out, e.g., enlarged and diminished. The SCROLL tool is represented by four arrowheads or triangles pointing in four ordinal directions and placing the cursor CC over one of the arrowheads and clicking causes the entire display to translate either horizontally or vertically in accordance with the direction of the arrowhead. The combination of ZOOM and SCROLL tools allows a user to, e.g., shift and enlarge the pictorial representation so as to view more clearly a desired portion of display 200, or to otherwise manipulate the pictorial representation.

The SEARCH tool is represented by a rectangular box marked SEARCH which has a window into which search criteria may be entered and a GO button to initiate the search. The SEARCH box may have a pull down menu to select the type of information that will be entered as a search criteria and may respond differently and offer different options to users having different levels of authorization.

For example, a customer C might only be permitted to enter search criteria relating to his own service, e.g., his address, telephone number, account number and/or circuit number, and those may be the only selections offered to a customer C on a pull down SEARCH menu. The GO button would initiate a search of the system 100 database using the information entered and retrieve from the system 100 database the status of those system elements that service that customers location. Display 200 is dimmed (brightness reduced) and the brightness of those elements that service that customer are brightened and highlighted in colors appropriate to their status, whereby the customer C can see exactly the status of his service. In addition, a pin or other icon LI may be displayed adjacent the location of that customer, e.g., as illustrated for the first customer C after transformer T in circuit 111. To access additional information concerning his service, customer C could move his cursor CC over any element of system 100 that provides his service and a status window W pops up to display status information relating to that customer's service. For a customer, the status information would typically be limited, e.g., to the estimated time or time period in which service is expected to be restored.

For example, a service crew would have access to the same display 200 but would have access to additional detailed information. A service crew might only be permitted to enter search criteria relating to the equipment and circuit or circuit it is assigned to work on, and optionally information relating to inventory and location of spare and replacement parts and equipment, and could access that information by entering, e.g., a service address, a circuit number, a pole number, a transformer, a part number, an equipment descriptor, an equipment identification number, a work crew identifier and/or a work order number, and those may be selections offered on a pull down SEARCH menu. The GO button would initiate a search of the system 100 database using the information entered and retrieve from the system 100 database the status of those system elements that relate to the service crews location and/or assignment. As an option, display 200 could be dimmed (brightness reduced) and the brightness of those elements that the service crew is to work on are brightened and highlighted in colors appropriate to their status, whereby the service crew can see exactly the status of service. In addition, a pin or other icon LI may be displayed adjacent the SEARCH location entered. To access additional information concerning the service crew assignment and circuits, the user could move his cursor CC over any element of system 100 that relates to the work assignment and a status window W pops up to display status information relating to that service, in greater detail indicating status of individual items of equipment and circuits. For a work crew (also referred to as a service crew), the status information would typically be limited, e.g., to the equipment and circuits assigned, the estimated time or time period in which repairs thereto are expected to be completed, availability and location of spare and replacement parts and equipment, and optionally a next work assignment. In addition, detail information available to a work crew might include the locations of other work crews that are nearby so that crews can assist each other as needed, e.g., where a line crew needs help from a tree clearing crew, or vice versa.

Finally, system operators, managers and/or supervisors have access to display 200 with all of its tools available and with complete detail of the information stored in the system 100 computer database, and so would be able to obtain all of the information that is available therein at any given time. Operation of the various tools and features of display 200 are as described above, however, plural display screens, and large display screens, may be provided so that different aspects of what has been described in relation to display 200 may be displayed simultaneously and enlarged, as might be suitable for use by a management team or crisis team.

Figure 3:
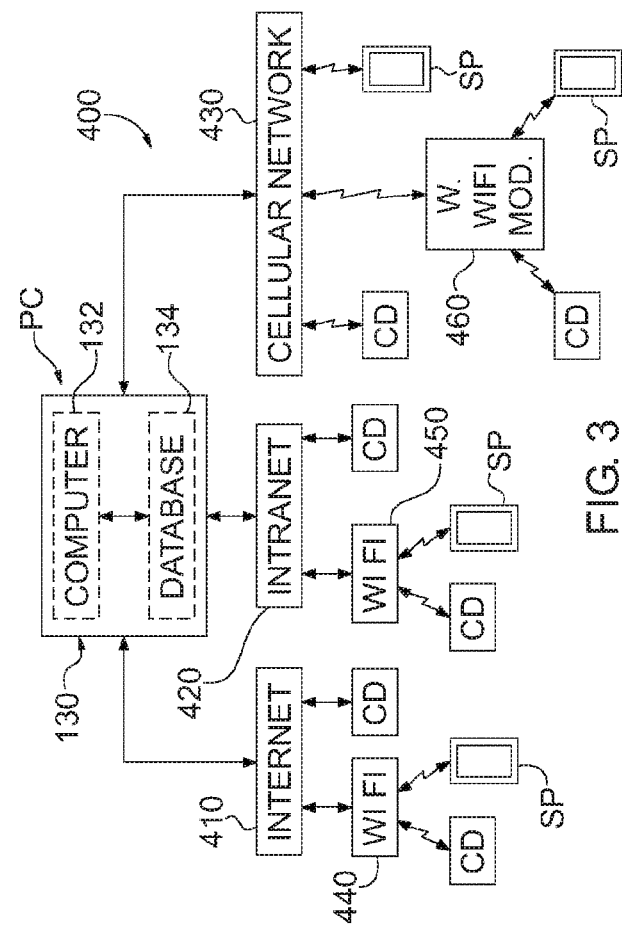
FIG. 3 is a schematic diagram of an example embodiment of a user access system usable for use with the distribution and/or collection system of FIG. 1.

FIG. 3 is a schematic diagram of an example embodiment of a user access system 400 usable for use with the distribution and/or collection system 100 of FIG. 1. Various types of users may access the database or databases 130 relating to system 100 with varying degrees of access to records and information, depending upon the level of access granted which typically relates to the purpose for which a user is allowed access, e.g., as to customers, service crews and managers as described above. Accordingly, various levels of access security are preferably provided, each including at least two or more separate items of information, e.g., log-in identity, passwords, and the like.

A processing computer PC, typically located in one or more centralized installations, may include one or more computers 132 and one or more databases 134 that contain customer and system records and information. Processing computer PC is in communication with users via various communication paths, e.g., via the Internet 410, an Intranet 420 and/or cellular network 430.

Communication via Internet 410 allows users wherever located with Internet access to communicate data and information in known manner to and from processing computer PC and the databases 134 therein. Access to the Internet 410 may be provided for computing devices CD by direct connection, e.g., a modem, router, LAN, ethernet, or server, or by wireless connection, e.g., through a WiFi network 440 connection. Smart phones SP may also have wireless access via WiFi network 440 and/or may serve as a wireless hotspot if so equipped. Typically, customers would be the most likely users to use this form of access via the Internet 410, and managers, supervisors, work crews and service crews could also use this form of access when in a location where such access is available.

Communication via Intranet 420 allows users wherever located with Intranet access to communicate data and information in known manner to and from processing computer PC and the databases 134 therein. Access to the Intranet 420 may be provided for computing devices CD by direct connection, e.g., a modem, router, LAN, ethernet, or server, or by wireless connection, e.g., through a WiFi network 450 connection. Smart phones SP may also have wireless access via WiFi network 450 and/or may serve as a wireless hotspot if so equipped. Typically, supervisors and managers would be the most likely users to use this form of access via Intranet 420, and work crews and service crews could also use this form of access if in a location where such access is available.

Communication via cellular communication network 430 allows users wherever located with cellular data access, e.g., via a data over cellular telephone connection and/or a cellular data connection, e.g., a 3G or 4G data connection, to communicate data and information in known manner to and from processing computer PC and the databases 134 therein. Access to the cellular network 430 may be provided for computing devices CD by direct wireless connection, e.g., a modem or router, or by indirect wireless connection, e.g., a connection through a wireless WiFi modem 460, such as a wireless Five-Spot™ mobile hotspot device available from Verizon Wireless. Smart phones SP may also have wireless access via WiFi network 450 and/or may serve as a wireless hotspot if so equipped. Typically, customers, managers/supervisors, work crews and service crews would be likely users to use this form of access via cellular network 430 when in a location where such access is available.

Security and control of access to the databases and information therein is preferably graduated depending upon the identity of the user seeking access. For example, for a customer who only has access to very limited information relating to his service, providing of any two types of information might be sufficient, e.g., any two selected from a name, address, telephone number, account number and the like, possibly excluding combinations that are available from public sources such as telephone listings. For a work or service crew, which has access to additional information, a specific user ID and password, and possibly a work order number, might typically be required, and an encrypted communication protocol is preferred. For managers and supervisors, which has access to essentially all of the information in the database, a specific user ID and complex password (e.g., a password having at least 8-10 characters some of which must be numerals and including both upper and lower case letters), and possibly an encrypted USB or fob device, might be required, and an encrypted communication protocol is strongly preferred.

Figure 4:
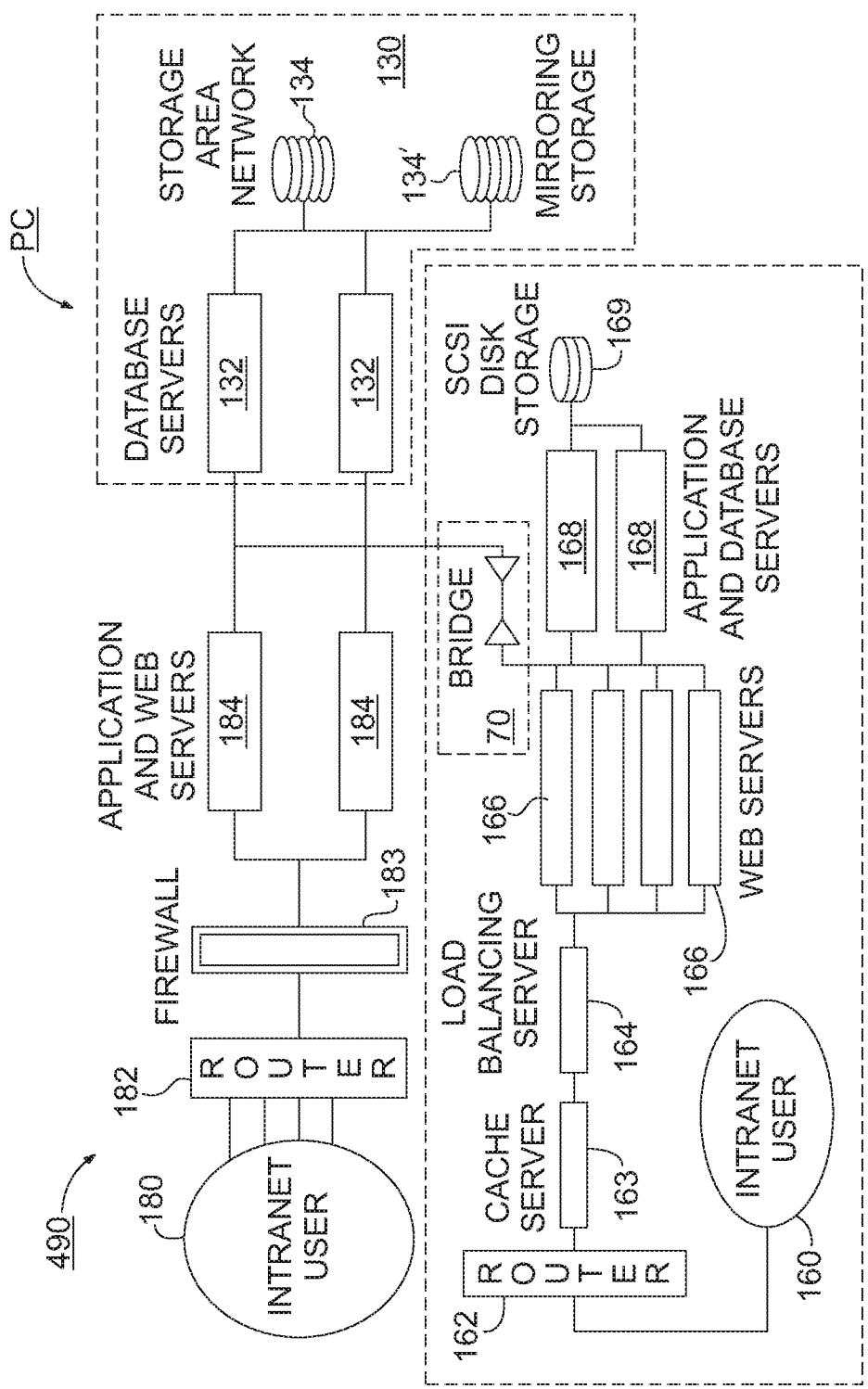
FIG. 4 is a schematic diagram of an example embodiment of apparatus including a communication network suitable for use with the example arrangement and devices of FIGS. 1-3.

FIG. 4 is a schematic diagram of an example embodiment of apparatus 490 including a communication network suitable for use with the example arrangement and devices of FIGS. 1-3. Communication between processing computer PC and user computers 160, 180, may involve communication via a communication path including, e.g., the Internet and/or an Intranet. A centralized computer arrangement 130 may include one or more database servers 132 coupled to one or more storage devices 134, wherein are customer and system databases maintained. Typically, one of the servers 132 and one of the storage devices 134' may be located at a geographically different location than is the main or primary server 132 and storage device 134, so as to provide data backup and protection against such dangers as fire, earthquake, storm, terror attack, and the like.

Typically, an Intranet user's computer 180 may communicate with the central computer 130 via a local hub and/or router 182 and one or more application and/or web servers 184. Typically and preferably a firewall 183 is provided for protecting computer PC from unauthorized access, from malicious codes and from unauthorized removal of data. Such Intranet may be or include a local hub, a router, an Ethernet, a local area network (LAN), a wide area network (WAN), a wireless network, a cellular network, a satellite network, or any other network.

Typically, such Intranet user 180 may be an official or employee of the agency or entity that operates distribution and/or collection system 100, e.g., a manager and/or supervisor, and so there may be many such users utilizing the system 100 via an Intranet. Alternatively and optionally, some or all of Intranet user computers 180 may have a signature capture device or other identification device for controlling access to the servers 130.

An Internet user computer 160 may communicate via a router 162, a load balancing server 163, one or more web servers 166 and one or more application and database servers 168. Internet user computers 160 for users having greater access than customers may have a signature or other biometric capture device or other identification device associated therewith for further controlling access to servers 166, 168. Typically a firewall is provided (e.g., on cache server 163, balancing server 164 and/or web servers 166) for protecting computer PC from unauthorized access, from malicious codes and from unauthorized removal of data.

A separate storage device 169 may provided for accumulating information provided via the Internet by Internet users from user computers 160, thereby to control data and information that may be added to main databases 134, and storage device 169 may be local, regional or central. Storage device 169 may store a limited set of customer and system database information that is restricted to certain classes of users, e.g., customers, so that such classes of users do not have access to the main database servers 132 and storage devices 134. Application and database servers 168 communicate with central computer 130 via bridge 170 and may exchange information between storage devices 134 and 169. Typically, such Internet user may be any of the persons and agencies identified, most likely customers seeking information regarding a service in which they have an interest, and there may be many such users utilizing the system 100 via the Internet. In addition, Internet users may include government agencies that may have or desire information pertinent thereto, such as security agencies, defense agencies, police and fire agencies, and regulatory agencies, that may need or desire information available via computer PC.

It is noted that computer PC may comprise any one or more of the server arrangement 130 and elements thereof, the server arrangement 168, 169 and elements thereof, and/or a separate computer, as may be convenient and desired. Typically, if a user is communicating with a computer PC via an Intranet or the Internet, then an arrangement such as server arrangement 130, 166-168, and/or elements thereof might be employed.

Because the system 400, 490 described preferably includes access via the Internet or another network or communication medium, properly authorized users such managers, supervisors, work crews and service crews may have essentially immediate access to the information authorized for access at any time authorized. Thus, such persons may have "real time," i.e. essentially immediate, access to the current and historical data and information in a local, regional and/or central database at any time, whereby interruptions and outages to service may be identified and acted upon quickly and appropriately. Alternatively, all or part of the system and customer database on computer PC may be loaded onto individual computers of select personnel, e.g., managers and supervisors, and to a lesser extent work and service crews, either via the Internet or other network or via floppy disk, CD-ROM, thumb drive, external hard drive, or other medium, for use at a site wherein Internet/intranet access is inconvenient or not available.

Suitable software for use with the foregoing includes, for example, the Microsoft SQL Server and IBM "DB2" database software and Microsoft ".NET" (Dot-NET) software framework which facilitates communication between various users and the computers of system 400, 490 and runs with the Microsoft Server-2000 server software, and other database and Internet software that is available from Microsoft Corp., Oracle Corp., Sybase Corp., IBM Corp., and other sources. Various other suitable software is available from different sources known to those of ordinary skill in the art, e.g., for data capture, databases, data retrieval, networking, Internet interfacing, ad hoc networking and the like.

Figure 5:
FIG. 5 is an example embodiment of an example database structure usable with the system and display of FIG. 1.

FIG. 5 is an example embodiment of a database structure 500 usable with the system 100 and display 200 of FIG. 1. Database structure 500 includes a system 100 relational database 510 and a customer relational database 520 which may be separate, but linked, databases or may be a single database, wherein searches and records can be made using either key words, an item of data or a statement of search or sorting criteria to obtain information from plural database records that relate to the subject of the inquiry. As a result, information in different records of separate databases that pertain to a given inquiry can quickly and easily be accumulated and presented in the result of a search or inquiry. In the context of system 100 and configuration representative display 200, such inquiries may be entered via the SEARCH box of display 200 and the information displayed in window W, e.g., status information, is information retrieved from databases 500, 510, 520.

In the system 100 database 510 or portion of database 500, the various data entered therein are stored in records and various classes of users may or may not have access to certain records and/or to certain records in such records. Customer information per se is not stored in the system database 510, but is linked by the relational aspects of the database software from customer database 520. The major set of records or files of database 510 is that which defines the configuration of system 100 and of the transmission lines, distribution lines, stations, substations, local distribution lines, local lines, transformers and the like which comprise system 100. These system 100 records and files may be maintained as part of a single database 500, but may also be maintained as a separate database that can be relationally related to database 500, e.g., by an engineering or construction organization that has responsibility for configuring and oversight of system 100.

System 100 related data, e.g., the status of service for each customer, e.g., whether service is out or there is some other problem, is entered into records in system database 510 (either by an automated outage reporting system or manually) and the status thereof is updated as additional and/or more recent information becomes available, e.g., from work crew reports. The status data thereof, e.g., as operating or as under repair or as out, from database 510 is utilized to cause the highlighting and/or coloring of the elements of system 100 in display 200, e.g., as green, yellow or red, respectively.

An estimated date and time when restoration of service is expected is also available to the customer, however, the information made available to the customer may be less specific or may indicate a slightly later time than is the corresponding information actually in the database records. For example, database 510 may have records indicating a planned starting time and a planned completion time for working to restore service, however, only information in the latter may be provided to a customer. As additional information becomes available, e.g., an actual starting time for repairs, the completion time also becomes more certain and a closer estimate may be made available. For example, when the work is only planned, several hours may be added to the planned completion time when responding to a customer inquiry and after repair work has begun and there is an actual starting repair time, the planned completion time data then available may be made available to the customer.

Work or service crews have access to more information, but less than full access, and typically may only be given access to information relating to the work orders and repairs to which they are assigned, e.g., a present and a next assignment or to assignments of a complete shift or day. This limited access can provide the crews the information they need to perform the work assigned within a planned time frame, but not more. For example, there may actually be early and late planned time information in the database records, and only the early planned time information may be available to the crews.

Records in database 510 may include outage and problem reports, both as initially reported and as supplemented by subsequent reports, inspections and other information, and the status of service for specific pieces of apparatus and equipment, at particular locations, for individual lines and cables, and for specific circuits which are typically identified by unique numbers reflecting the configuration of conductors thereof. Other data in database 510 may include service status by location, service status for specific equipment, a list of equipment in service, a listing of equipment in inventory, e.g., including type, model and storage location, service status by specific transmission and distribution line, status for each circuit, e.g., by location and/or identifying information, maintenance and repair history, work orders, planned start and completion dates and times for work, actual start and completion dates and times for work, and other data as might be considered useful and/or helpful.

To facilitate assignment and utilization of work crews, database 510 records include the status of work crews, e.g., whether on or off duty and the times thereof and the personnel available, which can be by name, employee number, known skills and the like. The database 510 records also indicate the location of each work crew, thereby to facilitate the planning and execution of the dispatch of crews and for moving crews where needed to gain cooperation of crews that are closely located in the field.

While the records and information available to a work crew may be limited to that relating to its assignments and work, managers, supervisors and system operators typically have broad access to all of the information stored in the system 100 database 500, 510, as well as to the limited information stored in a customer database 520.

Customer database 520 contains information that is limited in scope to that needed or helpful for operating, maintaining and repairing and restoring service of system 100. Thus customer name and address, telephone number and account number information may be included in customer database 520 because it would allow customers to be contacted and located by management and work crews in the field as might be needed to verify service status and/or gather additional information relating to a problem or its solution. Access to customer name, address and telephone data may be conditioned upon there being a work order, and work crew access to customer data may require the work order to be identified. Links from the work crew accessible customer data 520 to the system database 510 may be provided. Account information and billing information is not relevant to maintaining or operating distribution/collection system 100 and so is not available to those involved in operating system 100. Preferably, such customer billing, payment and accounting records are maintained in a separate database, e.g., by a billing and/or accounting function, and optionally a link thereto may be provided for the customer.

Figure 6:
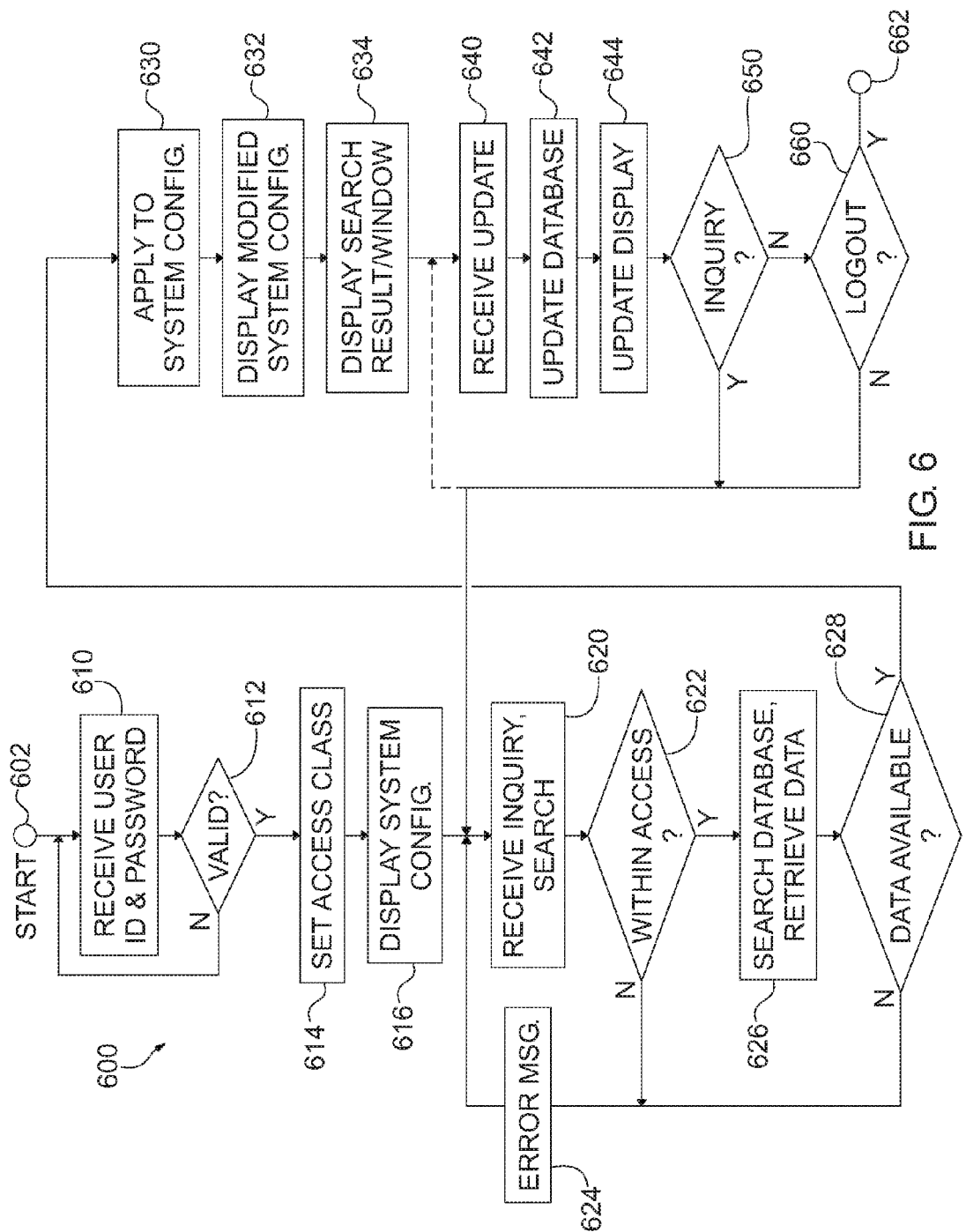
FIG. 6 is a schematic flow diagram illustrating a process of using a system database by various classes of users.
Figure 6A:
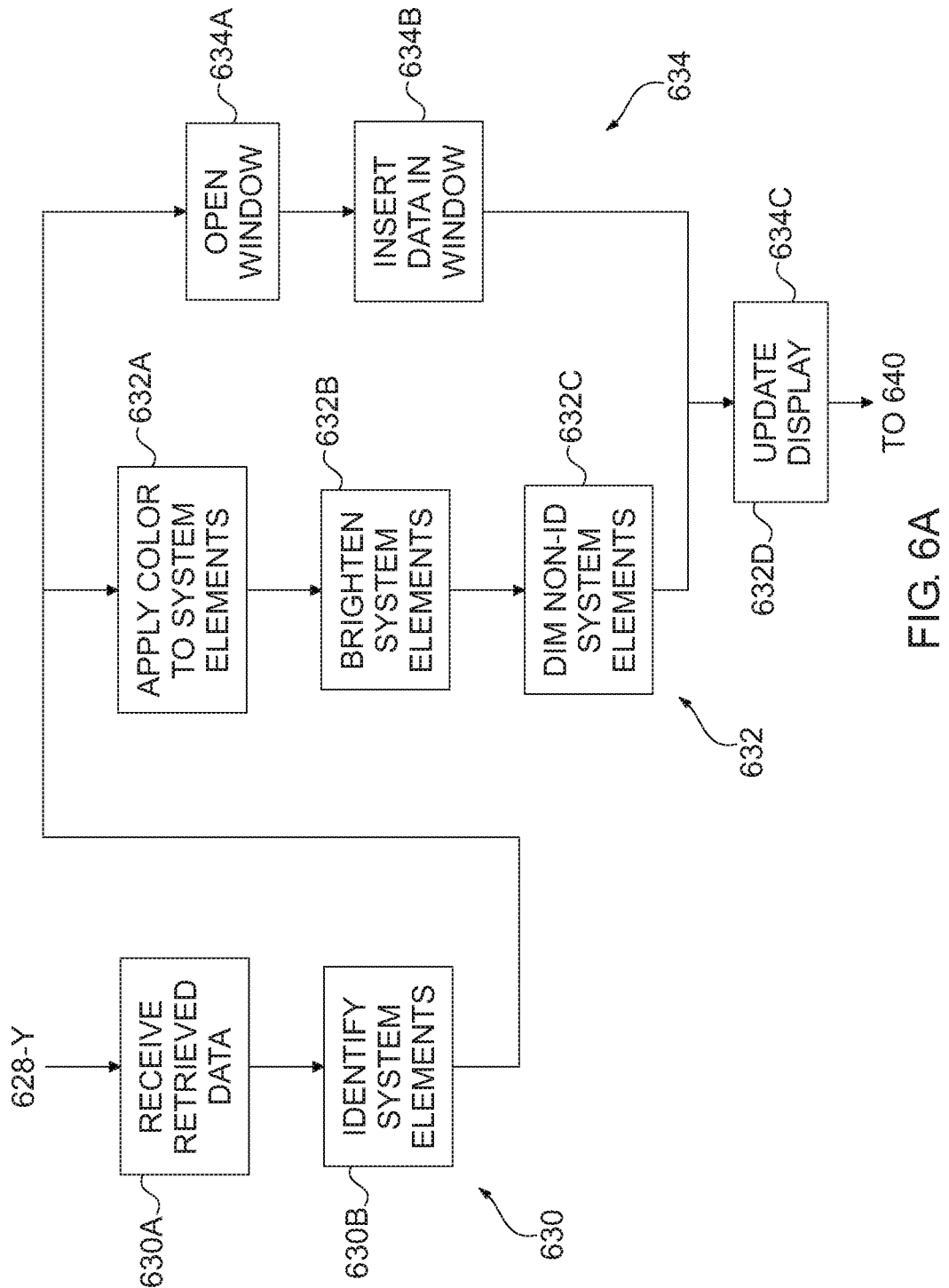
FIG. 6A is a schematic flow diagram illustrating an example embodiment of a portion of FIG. 6.

FIG. 6 is a schematic diagram flow chart illustrating a process 600 of using a system database 500, 510, 520 by various classes of users, and FIG. 6A is a schematic flow diagram illustrating an example embodiment of a portion 630-634 of FIG. 6. Process 600 starts 602 by receiving 610 a user security information, e.g., a user identifier and a user password and/or other security information, and determining 612 whether the received security information is valid. If the security information is not valid 612-N, process 600 returns to again await receiving 610 security information. If the received security information is valid 612-Y, the class or access which defines the data and information to which that user is authorized to have access is determined and set 614 and governs the remainder of process 600 for that user and the system 100 display 200 is displayed 616, e.g., on the user's computer or other device monitor. The display 200 may at this stage represent the configuration of system 100 apart from any operating condition thereof, e.g., as designed and constructed, or may be transformed, as is preferred, to include representations of the actual operating states of the various elements of system 100 as they are then known by information stored in database 500.

Process 600 now awaits an inquiry and/or a search request from the user, and when such request is received 620, it is first determined 622 whether the information requested is within the set 614 authorization for that user. If the request is not within the user's authorization 622-N, then an error message is displayed 624 and process 600 awaits another request. If the request is within the user's authorization 622-Y, then database 500 is searched 626 to retrieve 626 the requested data. If the data is not available 628-N, then an error message is displayed 624 and process 600 awaits another inquiry. It is noted that a request may be a search request entered placing a cursor CC over a SEARCH box of display 200 or may be by placing the cursor CC over an element of the display 200 of system 100 to cause an information box to appear 620-634.

If the requested data is available 628-Y, then the retrieved data is applied 630 to modify the system configuration display 200, e.g., by highlighting certain elements thereof and/or generating information windows, and the modified system configuration display 200 is displayed 632 and any search result is displayed 634 in an appropriate window. Thus, the display 200 of the configuration is transformed from representing an original or earlier state of system 100 to representing a present state of system 100 with certain elements highlighted and/or noticed in accordance with an information request from the user.

Process 600 next awaits receiving 640 an update, e.g., of system and/or status information, and updates 642 database 500 with the received 640 information, and optionally but preferably updates 644 the displayed system configuration 200 and other information if the newly received 640 information is applicable to the display 200.

Process 600 determines 650 as to whether an inquiry is received, and if so 650-Y, then process 600 returns to receive 620 and processes 620-634 that inquiry as previously described. If no inquiry is received 650-N, process 600 determines if a log out request is received 660. If a log out request is not received 660-N, then process 600 returns to 620 to await another inquiry and to 640 (dashed line) to await further updating information.

Thus, process 600 implements the displaying of a graphical representation 200 of system 100 and transforms that representation corresponding to changes in the operating state of system 100 as captured by the data and information stored in the system database 500, and display 200 is representative of the configuration and state of system 100, e.g., as represented by highlighting and/or coloring of the elements thereof. As the information in system database 500 is updated or otherwise changes, the displayed representation 200 of system 100 changes to corresponding to the changing conditions of system 100 and the changing of the highlighting and/or coloring of the elements thereof.

Regarding FIG. 6A, details of an example embodiment for applying 630 the retrieved data to modify the system configuration display 200, displaying 632 the modified system configuration display 200 and displaying 634 the search result are illustrated. Specifically, the applying 630 the retrieved data step may include receiving 630A the retrieved data produced by the database search 626, 628-Y wherein the data relates to, e.g., elements of system 100, and then identifying 630B the elements of system 100 therein that relate to the subject of the search inquiry.

For example, if the user is a customer inquiring regarding service to the customer location C, the retrieved 630A data would include those circuits and elements of system 100 that provide service to that location C and information pertaining to the operational status of those elements. If the user is work crew personnel inquiring regarding service to an identified circuit, system element or location, the retrieved data would include the identification of those circuits and elements of system 100 that relate thereto, as well as technical information and operational status information pertaining to those elements. From the retrieved data, the elements of display 200 that correspond to the elements of system 100 are identified 630B, because it is those display elements that are to be modified 630, 632.

The identified display 200 elements corresponding to the identified system 100 elements are modified 632. Modifying 632 those display 200 elements may include, e.g., applying 632A color to the identified display elements, e.g., green for operational, red for out of service, and yellow for undergoing repair or maintenance Modifying 632 those display 200 elements may include, e.g., increasing 632B the brightness and/or contrast of the display 200 element corresponding to the identified 630B system elements in display 200 so that they become more visible relative to the entire display 200. Modifying 632 the display 200 elements may include, e.g., decreasing 632C the brightness and/or contrast of the display 200 elements not corresponding to the identified 630B system elements (e.g., dimming 632C the non-identified elements) in display 200 so that they become less visible relative to the entire display 200, and the decreasing 632B could even reach the complete darkening of these non-identified elements. Any of the foregoing modifying 632 steps may be applied individually or in any combination, and so, e.g., only the colorization 632A might be utilized, or colorizing 632A might be used with brightening 632B, or brightening 632B might be used with dimming 632C, brightening 632B may be used with dimming 632C, an so forth. The resulting modified display is displayed 632D in monitor display 200.

The display 200 may also be modified 634 for displaying 632D, 634C information associated with system elements identified 630B. For example, a window W may be opened 634A in display 200 and the data received 630A pertaining to identified 630B system 100 elements is inserted into window W which is displayed 634C in display 200. It is noted that this sequence may be initiated by a search inquiry being entered in SEARCH window or by the cursor CC being placed over an element of system 100 in display 200. It is further noted that the data displayed 634C in window W may be a set of items some or all of which are themselves entries into further windows containing additional related information. For example, where a work crew enters a circuit identifier as a search inquiry, the information returned in window W may include a listing of various elements of system 100 such as lines and equipment relating to the inquiry. Then placing the cursor CC over an item of that listing opens a further window with additional information pertaining to that item, e.g., if cursor CC is placed over a transformer T, then information in the additional window could include the location of the transformer, the pole number, a nearby address, it s part and inventory numbers, its electrical characteristics and the like.

For simplicity, the display system may display 632D, 634C modified information 632, 634 as that modified information becomes available (e.g., 632C and/or 643B), which may result in computer display 200 changing two or more times as data becomes available, or may wait until both the paths 632, 634 for display of system 100 elements are modified 632 and 634 and then update 632D, 634C display 200 substantially all at once.

Thus, the display 200 of the configuration is transformed from representing an original or earlier state of system 100 to representing a present state of system 100 with certain elements highlighted and/or noticed in accordance with an information request from the user.

A method 600 for displaying a representation 200 of the configuration of a distribution and/or collection system 100 and the operating status thereof, the method 600 may comprise: receiving 610 an access request from a user and if the access request is validated 612, then: obtaining 616 a representation 200 of the elements and configuration of the distribution and/or collection system 100; displaying 616 the representation 200 of the elements and configuration of the distribution and/or collection system 100 on a display; storing 640, 642 information relating to the elements of the distribution and/or collection system 100 and to the operating state of the elements of the distribution and/or collection system 100 in a relational database 500; obtaining 644 from the relational database 500 information representing the operating state of the elements of the distribution and/or collection system 100; and modifying 630 the displayed representation of the elements and configuration of the distribution and/or collection system 100 in accordance with the database 500 information to represent the operating state of the elements of the distribution and/or collection system 100. The distribution and/or collection system 100 may include an electric power distribution system, a gas distribution system, a telephone communication system, a communication system, a water distribution system, a water collection system, a sewage collection system, or a trash collection system. The displayed representation 200 of the elements and configuration of the distribution and/or collection system 100 may be conformed to locations of the elements thereof on a map corresponding to a geographic area served by the distribution and/or collection system, and wherein the displayed representation of the distribution and/or collection system includes one or more representations of a geographic location V, a geographic feature R and/or a political boundary B. The method may further comprise: determining 614 a level of access for the user; and limiting 622 the displayed representation 200 of the elements and configuration of the distribution and/or collection system 100 in accordance with the determined level of access. The method may further comprise: receiving 620 an information request from the user; determining 622 whether the information request is authorized for the level of access of the user; and if the information request is authorized, then retrieving 626 the information requested from the database 500 of information representing the operating state of the elements of the distribution and/or collection system 100. Emphasizing 632 the retrieved information may include: dimming 632C the displayed representation 200 of the elements and configuration of the distribution and/or collection system 100 other than for the retrieved 626, 630 information; or highlighting 632B the retrieved information 626, 630 in the displayed representation 200 of the elements and configuration of the distribution and/or collection system 100; or highlighting 632B the retrieved information 626, 630 in the displayed representation 200 of the elements and configuration of the distribution and/or collection system 100 and dimming 632C the displayed representation 200 of the elements and configuration of the distribution and/or collection system 100 other than for the retrieved information 626, 630.

A system 300, 400 for displaying a representation 200 of the configuration of a distribution and/or collection system 100 and the operating status thereof, may comprise: a computer PC, 130 for receiving and validating an access request from a user; a storage device 134, 169 storing a representation of the elements PS, S, SS, T, TL1, TL2, LD, LL, PM and configuration of the distribution and/or collection system 100; the storage device 134, 169 further storing information relating to the elements of the distribution and/or collection system 100 and the operating state of the elements of the distribution and/or collection system 100 in a relational database 500; wherein the computer PC, 130 generates from the stored representation of the elements and configuration of the distribution and/or collection system a displayable representation of the elements and configuration of the distribution and/or collection system 100 that is transformed in accordance with the database 500 information to represent the operating state of the elements of the distribution and/or collection system 100; and a communication port 410, 420, 430, 440, 450, 460 for transmitting the transformed displayable representation 200 of the elements and configuration of the distribution and/or collection system 100 to a display 200. The distribution and/or collection system 100 may include an electric power distribution system, a gas distribution system, a telephone communication system, a communication system, a water distribution system, a water collection system, a sewage collection system, or a trash collection system. The displayable representation 200 of the elements and configuration of the distribution and/or collection system may be conformed to locations of the elements thereof on a map corresponding to a geographic area served by the distribution and/or collection system 100, and wherein the displayable representation of the distribution and/or collection system 100 includes one or more representations of a geographic location V, a geographic feature R and/or a political boundary B. The computer PC, 130 may determine 614 a level of access for the user; and may limit 622 the displayable representation of the elements and configuration of the distribution and/or collection system 100 in accordance with the determined level of access. The computer PC, 130 may receive 620 an information request from the user; may determine 622 whether the information request is authorized for the level of access of the user; and if the information request is authorized, then the computer PC, 130 may retrieve the information requested from the database 500 of information representing the operating state of the elements of the distribution and/or collection system 100. The computer: PC may receive 620 an information request from the user; retrieve 626 the information requested from the database 500 of information representing the operating state of the elements of the distribution and/or collection system 100; and may modify 630-632 the displayed representation 200 of the elements and configuration of the distribution and/or collection system 100 to emphasize 632A, 632B, 632C, 634A, 634B the retrieved information 626, 630. The computer may emphasize 632A, 632B, 632C, 634A, 634B the retrieved information 626, 630 by: dimming 632C the displayed representation 200 of the elements and configuration of the distribution and/or collection system 100 other than for the retrieved information 626, 630; or highlighting 632A, 632B the retrieved information 626, 630 in the displayed representation 200 of the elements and configuration of the distribution and/or collection system 100; or highlighting 632B the retrieved information 626, 630 in the displayed representation 200 of the elements and configuration of the distribution and/or collection system 100 and dimming 632C the displayed representation 200 of the elements and configuration of the distribution and/or collection system 100 other than for the retrieved information 626, 630. The system may further comprise: an input device CD, SP for inputting information relating to the distribution and/or collection system 100 and/or elements and conditions thereof and/or relating to a search inquiry; or a display 200, CD, SP for displaying the displayable representation 200 of the elements and configuration of the distribution and/or collection system 100; or an input device CD, SP for inputting information relating to the distribution and/or collection system 100 and/or elements and conditions thereof and/or relating to a search inquiry and a display 200, CD, SP for displaying the displayable representation 200 of the elements and configuration of the distribution and/or collection system 100.

A computer-readable storage medium encoded with computer instructions for displaying a representation 200 of the configuration of a distribution and/or collection system 100 and the operating status thereof, may comprise: means for causing a computer PC, 130 to receive 610 an access request from a user and if the access request is validated 612, then: means for causing the computer PC, 130 to obtain 616 a representation 200 of the elements and configuration of the distribution and/or collection system 100; means for causing the computer PC, 130 to display 616 the representation 200 of the elements and configuration of the distribution and/or collection system 100 on a display; means for causing the computer PC, 130 to store 640, 642 information relating to the elements of the distribution and/or collection system 100 and to the operating state of the elements of the distribution and/or collection system 100 in a relational database 500; means for causing the computer PC, 130 to obtain 626, 642 from the relational database 500 information representing the operating state of the elements of the distribution and/or collection system 100; means for causing the computer PC, 130 to modify 630, 642 the displayed representation 200 of the elements and configuration of the distribution and/or collection system 100 in accordance with the database information to represent the operating state of the elements of the distribution and/or collection system 100. The displayed representation 200 of the elements and configuration of the distribution and/or collection system 100 may be conformed to locations of the elements thereof on a map corresponding to a geographic area served by the distribution and/or collection system 100, and the displayed representation 200 of the distribution and/or collection system 100 may include one or more representations 200 of a geographic location, a geographic feature and/or a political boundary. The computer-readable storage medium may further comprise: means for causing the computer PC, 130 to receive 620 an information request from the user; means for causing the computer PC, 130 to retrieve 626 the information requested from the database 500 of information representing the operating state of the elements of the distribution and/or collection system 100; and means for causing the computer PC, 130 to modify 630, 642 the displayed representation 200 of the elements and configuration of the distribution and/or collection system 100 to emphasize the retrieved information. The means for causing the computer PC, 130 to modify the displayed representation 200 to emphasize the retrieved information may include: means for causing the computer PC, 130 to dim 632C the displayed representation 200 of the elements and configuration of the distribution and/or collection system 100 other than for the retrieved information; or means for causing the computer PC, 130 to highlight 632B the retrieved information in the displayed representation 200 of the elements and configuration of the distribution and/or collection system 100; or means for causing the computer PC, 130 to highlight 632B the retrieved information in the displayed representation 200 of the elements and configuration of the distribution and/or collection system 100 and to dim 632C the displayed representation 200 of the elements and configuration of the distribution and/or collection system 100 other than for the retrieved information.

A method 600 for displaying a representation 200 of the configuration of a distribution and/or collection system 100 and the operating status thereof, the method 600 may comprise: receiving 610 an access request from a user and if the access request is validated 612, then: obtaining 616 a representation 200 of the elements and configuration of the distribution and/or collection system 100; providing 616 the representation 200 of the elements and configuration of the distribution and/or collection system 100 for display 616 on a display; storing 640, 642 information relating to the elements of the distribution and/or collection system 100 and to the operating state of the elements of the distribution and/or collection system 100 in a relational database 500; obtaining 644 from the relational database 500 information representing the operating state of the elements of the distribution and/or collection system 100; modifying 630 the representation of the elements and configuration of the distribution and/or collection system 100 in accordance with the database 500 information to represent the operating state of the elements of the distribution and/or collection system 100; and providing 616 the modified representation of the elements and configuration of the distribution and/or collection system 100 for display on a display 200. The distribution and/or collection system 100 may include an electric power distribution system, a gas distribution system, a telephone communication system, a communication system, a water distribution system, a water collection system, a sewage collection system, or a trash collection system. The representation 200 of the elements and configuration of the distribution and/or collection system 100 may be conformed to locations of the elements thereof on a map corresponding to a geographic area served by the distribution and/or collection system, and the representation of the distribution and/or collection system may include one or more representations of a geographic location V, a geographic feature R and/or a political boundary B. The method may further comprise: determining 614 a level of access for the user; and limiting 622 the representation 200 of the elements and configuration of the distribution and/or collection system 100 in accordance with the determined level of access. The method may further comprise: receiving 620 an information request from the user; determining 622 whether the information request is authorized for the level of access of the user; and if the information request is authorized, then retrieving 626 the information requested from the database 500 of information representing the operating state of the elements of the distribution and/or collection system 100. The method 600 may further comprise: receiving 620 an information request from the user; retrieving 626 the information requested from the database 500 of information representing the operating state of the elements of the distribution and/or collection system 100; and modifying 630, 642 the representation 200 of the elements and configuration of the distribution and/or collection system 100 to emphasize 632 the retrieved information. Emphasizing 632 the retrieved information may include: dimming 632C the representation 200 of the elements and configuration of the distribution and/or collection system 100 other than for the retrieved 626, 630 information; or highlighting 632B the retrieved information 626, 630 in the representation 200 of the elements and configuration of the distribution and/or collection system 100; or highlighting 632B the retrieved information 626, 630 in the representation 200 of the elements and configuration of the distribution and/or collection system 100 and dimming 632C the representation 200 of the elements and configuration of the distribution and/or collection system 100 other than for the retrieved information 626, 630.

A system 300, 400 for displaying a representation 200 of the configuration of a distribution and/or collection system 100 and the operating status thereof, may comprise: a computer PC, 130 for receiving and validating an access request from a user; a storage device 134, 169 storing a representation of the elements PS, S, SS, T, TL1, TL2, LD, LL, PM and configuration of the distribution and/or collection system 100; the storage device 134, 169 further storing information relating to the elements of the distribution and/or collection system 100 and the operating state of the elements of the distribution and/or collection system 100 in a relational database 500; wherein the computer PC, 130 generates from the stored representation of the elements and configuration of the distribution and/or collection system a displayable representation of the elements and configuration of the distribution and/or collection system 100 that is transformed in accordance with the database 500 information to represent the operating state of the elements of the distribution and/or collection system 100; and a communication port 410, 420, 430, 440, 450, 460 for transmitting the transformed displayable representation 200 of the elements and configuration of the distribution and/or collection system 100 to a display 200. The distribution and/or collection system 100 may include an electric power distribution system, a gas distribution system, a telephone communication system, a communication system, a water distribution system, a water collection system, a sewage collection system, or a trash collection system. The displayable representation 200 of the elements and configuration of the distribution and/or collection system may be conformed to locations of the elements thereof on a map corresponding to a geographic area served by the distribution and/or collection system 100, and wherein the displayable representation of the distribution and/or collection system 100 includes one or more representations of a geographic location V, a geographic feature R and/or a political boundary B. The computer PC, 130 may determine 614 a level of access for the user; and may limit 622 the displayable representation of the elements and configuration of the distribution and/or collection system 100 in accordance with the determined level of access. The computer PC, 130 may receive 620 an information request from the user; may determine 622 whether the information request is authorized for the level of access of the user; and if the information request is authorized, then the computer PC, 130 may retrieve the information requested from the database 500 of information representing the operating state of the elements of the distribution and/or collection system 100. The computer: PC may receive 620 an information request from the user; may retrieve 626 the information requested from the database 500 of information representing the operating state of the elements of the distribution and/or collection system 100; and may modify 630-632 the displayable representation 200 of the elements and configuration of the distribution and/or collection system 100 to emphasize 632A, 632B, 632C, 634A, 634B the retrieved information 626, 630. The computer may emphasize 632A, 632B, 632C, 634A, 634B the retrieved information 626, 630 by: dimming 632C the displayable representation 200 of the elements and configuration of the distribution and/or collection system 100 other than for the retrieved information 626, 630; or highlighting 632A, 632B the retrieved information 626, 630 in the displayable representation 200 of the elements and configuration of the distribution and/or collection system 100; or highlighting 632B the retrieved information 626, 630 in the displayable representation 200 of the elements and configuration of the distribution and/or collection system 100 and dimming 632C the displayable representation 200 of the elements and configuration of the distribution and/or collection system 100 other than for the retrieved information 626, 630. The system may further comprise: an input device CD, SP for inputting information relating to the distribution and/or collection system 100 and/or elements and conditions thereof and/or relating to a search inquiry; or a display 200, CD, SP for displaying the displayable representation 200 of the elements and configuration of the distribution and/or collection system 100; or an input device CD, SP for inputting information relating to the distribution and/or collection system 100 and/or elements and conditions thereof and/or relating to a search inquiry and a display 200, CD, SP for displaying the displayable representation 200 of the elements and configuration of the distribution and/or collection system 100.

A computer-readable storage medium encoded with computer instructions for displaying a representation 200 of the configuration of a distribution and/or collection system 100 and the operating status thereof, may comprise: means for causing a computer PC, 130 to receive 610 an access request from a user and if the access request is validated 612, then:

means for causing the computer PC, 130 to obtain 616 a representation 200 of the elements and configuration of the distribution and/or collection system 100; means for causing the computer PC, 130 to provide 616 the representation 200 of the elements and configuration of the distribution and/or collection system 100 for display 616 on a display; means for causing the computer PC, 130 to store 640, 642 information relating to the elements of the distribution and/or collection system 100 and to the operating state of the elements of the distribution and/or collection system 100 in a relational database 500; means for causing the computer PC, 130 to obtain 626, 642 from the relational database 500 information representing the operating state of the elements of the distribution and/or collection system 100; means for causing the computer PC, 130 to modify 630, 642 the representation 200 of the elements and configuration of the distribution and/or collection system 100 in accordance with the database information to represent the operating state of the elements of the distribution and/or collection system 100; and means for causing the computer PC, 130 to provide 632, 644 the modified representation 200 of the elements and configuration of the distribution and/or collection system 100 for display 632, 644 on a display. The representation 200 of the elements and configuration of the distribution and/or collection system 100 may be conformed to locations of the elements thereof on a map corresponding to a geographic area served by the distribution and/or collection system 100, and the representation 200 of the distribution and/or collection system 100 may include one or more representations 200 of a geographic location, a geographic feature and/or a political boundary. The computer-readable storage medium may further comprise: means for causing the computer PC, 130 to receive 620 an information request from the user; means for causing the computer PC, 130 to retrieve 626 the information requested from the database 500 of information representing the operating state of the elements of the distribution and/or collection system 100; and means for causing the computer PC, 130 to modify 630, 642 the representation 200 of the elements and configuration of the distribution and/or collection system 100 to emphasize the retrieved information. The means for causing the computer PC, 130 to modify the representation 200 to emphasize the retrieved information may include: means for causing the computer PC, 130 to dim 632C the representation 200 of the elements and configuration of the distribution and/or collection system 100 other than for the retrieved information; or means for causing the computer PC, 130 to highlight 632B the retrieved information in the representation 200 of the elements and configuration of the distribution and/or collection system 100; or means for causing the computer PC, 130 to highlight 632B the retrieved information in the representation 200 of the elements and configuration of the distribution and/or collection system 100 and to dim 632C the representation 200 of the elements and configuration of the distribution and/or collection system 100 other than for the retrieved information.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

The present arrangement can be embodied as a computer implemented process or processes and/or apparatus for performing such computer-implemented process or processes, and can also be embodied in the form of a tangible non-transitory storage medium containing a computer program or other computer readable or machine-readable instructions (herein "computer program"), wherein when the computer program is loaded into a computer or other processor (herein "computer") and/or is executed by the computer, the computer becomes an apparatus for practicing the process or processes. Storage media for containing such computer program include, for example, floppy disks and diskettes, compact disk (CD)-ROMs (whether or not writeable), DVD digital disks, RAM and ROM memories, computer hard drives and back-up drives, external hard drives, "thumb" drives, and any other storage medium readable by a computer. The process or processes can also be embodied in the form of a computer program, for example, whether stored in a storage medium or transmitted over a transmission medium such as electrical conductors, fiber optics or other light conductors, or by electromagnetic radiation, wherein when the non-transitory computer program is loaded into a computer and/or is executed by the computer, the computer becomes an apparatus for practicing the process or processes. The process or processes may be implemented on a general purpose microprocessor or on a digital processor specifically configured to practice the process or processes. When a general-purpose microprocessor is employed, the computer program code configures the circuitry of the microprocessor to create specific logic circuit arrangements. Storage medium readable by a computer includes medium being readable by a computer per se or by another machine that reads the computer instructions for providing those instructions to a computer for controlling its operation. Such machines may include, for example, a punched card reader, a magnetic tape reader, a magnetic card reader, a memory card reader, an optical scanner, as well as machines for reading the storage media mentioned above.

It is noted that various sensor values and alarm values represent actual physical conditions of different systems, places and/or different equipment and/or different parts of an system, installation or other place, e.g., generally local conditions, that are transformed by the system and method described herein to provide a representation of the overall state and/or condition of the system, installation, or place, e.g. a representation of the complete system, installation, and/or place. That representation may be transformative of a representation of a nominal overall state and/or condition thereof, e.g., in a prior or different condition and/or time, to a representation of an actual overall state and/or condition thereof, e.g., in a present or more recent or otherwise different condition and/or time. Further, the system and method generates tasks and commands that are executed to transform the system, installation, or place into a different configuration, i.e. into a different system, installation, or place, and a representation of that different configuration is provided or displayed, e.g., to human operators and/or customers. The system described herein may include one or more general purpose and/or special purpose computers, or microprocessors or other processors, and the method described herein may be performed in part by one or more general purpose and/or special purpose computers, or microprocessors or other processors.

While the present invention has been described in terms of the foregoing example embodiments, variations within the scope and spirit of the present invention as defined by the claims following will be apparent to those skilled in the art.

For example, input devices usable for inputting information and/or inquiries and/or search requests may include, in addition to computing devices CD and smart phones SP, keyboards, touch screens, speech recognition devices, pen devices, and the like.

Further output devices and displays, e.g., for displaying the displayable representation of system 100, may include, in addition to computing devices CD and smart phones SP, monitors, televisions, touch screens, projection displays, and the like.

What is claimed is:

1. A method for displaying a representation of the configuration of a utility distribution system or a utility collection system or a utility distribution and collection system, herein referred to as a distribution and/or collection system, wherein the distribution and/or collection system includes an electric power distribution system, a gas distribution system, a telephone communication system, a communication system, a water distribution system, a water collection system, a sewage collection system, or a trash collection system, the distribution and/or collection system having a central source element and plural distribution elements and having distribution connection elements with and among the central source element and the plural distribution elements for serving plural customers, and the operating status thereof, the method comprising:

receiving an access request from a user and if the access request is validated, then:

determining a level of access for the user, wherein the user includes a customer or a worker or a manager or supervisor, and wherein the level of access of a customer is limited to the distribution elements and the distribution connection elements of the distribution and/or collection system utilized in providing distribution to or collection from that customer or in providing both distribution to and collection from that customer;

obtaining a representation of the elements and configuration of the distribution and/or collection system;

limiting the representation of the elements and configuration of the distribution and/or collection system in accordance with the determined level of access;

providing the representation of the elements and configuration of the distribution and/or collection system for display on a display, wherein the display for a customer is limited to the distribution elements and distribution connection elements of the distribution and/or collection system that serve that customer in accordance with the customer level of access;

storing information relating to the elements of the distribution and/or collection system and to the operating state of the elements of the distribution and/or collection system in a relational database;

obtaining from the relational database information representing the operating state of the elements of the distribution and/or collection system;

modifying the representation of the elements and configuration of the distribution and/or collection system in accordance with the database information to represent the operating state of the elements of the distribution and/or collection system; and providing the modified representation of the elements and configuration of the distribution and/or collection system for display on a display, wherein the display for a customer is limited to the distribution elements and distribution connection elements of the distribution and/or collection system that serve that customer in accordance with the customer level of access, whereby a customer obtains data relating to only that portion of the distribution elements and distribution connection elements and status of the distribution and/or collection system that are utilized to provide service to that customer.

2. The method of claim 1 wherein the representation of the elements and configuration of the distribution and/or collection system is conformed to locations of the elements thereof on a map corresponding to a geographic area served by the distribution and/or collection system, and wherein the representation of the distribution and/or collection system includes one or more representations of a geographic location, a geographic feature or a political boundary, or a combination thereof.

3. The method of claim 1 further comprising:
receiving an information request from the user;
determining whether the information request is authorized for the level of access of the user; and
if the information request is authorized, then retrieving the information requested from the database of information representing the operating state of the elements of the distribution and/or collection system that is limited in accordance with the customer level of access.

4. The method of claim 1 further comprising:
receiving an information request from the user;
retrieving the information requested from the database of information representing the operating state of the elements of the distribution and/or collection system; and
modifying the representation of the elements and configuration of the distribution and/or collection system to emphasize the retrieved information.

5. The method of claim 4 wherein the modifying the representation to emphasize the retrieved information includes:
dimming the representation of the elements and configuration of the distribution and/or collection system other than for the retrieved information; or
highlighting the retrieved information in the representation of the elements and configuration of the distribution and/or collection system; or
highlighting the retrieved information in the representation of the elements and configuration of the distribution and/or collection system and dimming the representation of the elements and configuration of the distribution and/or collection system other than for the retrieved information.

6. A system for displaying a representation of the configuration of a utility distribution system or a utility collection system or a utility distribution and collection system, herein referred to as a distribution and/or collection system, wherein the distribution and/or collection system includes an electric power distribution system, a gas distribution system, a telephone communication system, a communication system, a water distribution system, a water collection system, a sewage collection system, or a trash collection system, the distribution and/or collection system having a central source element and plural distribution elements and having distribution connection elements with and among the central source element and the plural distribution elements for serving plural customers, and the operating status thereof, comprising:

a computer for receiving and validating an access request from a user;

a storage device storing a representation of the elements and configuration of the distribution and/or collection system;

the storage device further storing information relating to the elements of the distribution and/or collection system and to the operating state of the elements of the distribution and/or collection system in a relational database;
wherein the computer determines a level of access for the user, wherein the user includes a customer or a worker or a manager or supervisor, and wherein the level of access of a customer is limited to the distribution elements and the distribution connection elements of the distribution and/or collection system utilized in providing distribution to or collection from that customer or in providing both distribution to and collection from that customer;
wherein the computer generates from the stored representation of the elements and configuration of the distribution and/or collection system a displayable representation of the elements and configuration of the distribution and/or collection system that is transformed in accordance with the database information to represent the operating state of the elements of the distribution and/or collection system;
wherein the computer limits the displayable representation of the elements and configuration of the distribution and/or collection system for a customer to the distribution elements and distribution connection elements of the distribution and/or collection system that serve that customer in accordance with the customer level of access; and
a communication port for transmitting the transformed displayable representation of the elements and configuration of the distribution and/or collection system to a display, wherein the display for a customer is limited to the distribution elements and distribution connection elements of the distribution and/or collection system that serve that customer in accordance with the customer level of access,
whereby a customer obtains data relating to only that portion of the distribution elements and distribution connection elements and status of the distribution and/or collection system that are utilized to provide service to that customer.

7. The system of claim 6 wherein the displayable representation of the elements and configuration of the distribution and/or collection system is conformed to locations of the elements thereof on a map corresponding to a geographic area served by the distribution and/or collection system, and wherein the displayable representation of the distribution and/or collection system includes one or more representations of a geographic location, a geographic feature or a political boundary, or a combination thereof.

8. The system of claim 6 wherein the computer:
receives an information request from the user;
determines whether the information request is authorized for the level of access of the user; and
if the information request is authorized, then the computer retrieves the information requested from the database of information representing the operating state of the elements of the distribution and/or collection system that is limited in accordance with the customer level of access.

9. The system of claim 6 wherein the computer:
receives an information request from the user;
retrieves the information requested from the database of information representing the operating state of the elements of the distribution and/or collection system; and
modifies the displayable representation of the elements and configuration of the distribution and/or collection system to emphasize the retrieved information.

10. The system of claim 9 wherein the computer emphasizes the retrieved information by:

dimming the displayable representation of the elements and configuration of the distribution and/or collection system other than for the retrieved information; or
highlighting the retrieved information in the displayable representation of the elements and configuration of the distribution and/or collection system; or
highlighting the retrieved information in the displayable representation of the elements and configuration of the distribution and/or collection system and dimming the displayable representation of the elements and configuration of the distribution and/or collection system other than for the retrieved information.

11. The system of claim 6 further comprising:
an input device for inputting information relating to the distribution and/or collection system or relating to elements and conditions thereof or relating to a search inquiry, or relating to a combination thereof; or
a display for displaying the displayable representation of the elements and configuration of the distribution and/or collection system; or
an input device for inputting information relating to the distribution and/or collection system or relating to elements and conditions thereof or relating to a search inquiry, or relating to a combination thereof and a display for displaying the displayable representation of the elements and configuration of the distribution and/or collection system.

12. A non-transitory computer-readable storage medium encoded with computer instructions for displaying a representation of the configuration of a utility distribution system or a utility collection system or a utility distribution and collection system, herein referred to as a distribution and/or collection system, wherein the distribution and/or collection system includes an electric power distribution system, a gas distribution system, a telephone communication system, a communication system, a water distribution system, a water collection system, a sewage collection system, or a trash collection system, the distribution and/or collection system having a central source element and plural distribution elements and having distribution connection elements with and among the central source element and the plural distribution elements for serving plural customers, and the operating status thereof, comprising:
causing a computer to receive an access request from a user and if the access request is validated, then:
causing the computer to determine a level of access for the user, wherein the user includes a customer or a worker or a manager or supervisor, and wherein the level of access of a customer is limited to distribution elements and the distribution connection elements of the distribution and/or collection system utilized in providing distribution to or collection from that customer or in providing both distribution to and collection from that customer;
causing the computer to obtain a representation of the elements and configuration of the distribution and/or collection system;
causing the computer to limit the representation of the elements and configuration of the distribution and/or collection system in accordance with the determined level of access;
causing the computer to provide the representation of the elements and configuration of the distribution and/or collection system for display on a display, wherein the computer limits the display for a customer to the distribution elements and distribution connection elements of the distribution and/or collection system that serve that customer in accordance with the customer level of access;

causing the computer to store information relating to the elements of the distribution and/or collection system and to the operating state of the elements of the distribution and/or collection system in a relational database;

causing the computer to obtain from the relational database information representing the operating state of the elements of the distribution and/or collection system;

causing the computer to modify the representation of the elements and configuration of the distribution and/or collection system in accordance with the database information to represent the operating state of the elements of the distribution and/or collection system; and causing the computer to provide the modified representation of the elements and configuration of the distribution and/or collection system for display on a display, wherein the computer limits the display for a customer to the distribution elements and distribution connection elements of the distribution and/or collection system that serve that customer in accordance with the customer level of access, whereby the computer provides to a customer data relating to only that portion of the distribution elements and distribution connection elements and status of the distribution and/or collection system that are utilized to provide service to that customer.

13. The computer-readable storage medium of claim 12 wherein the representation of the elements and configuration of the distribution and/or collection system is conformed to locations of the elements thereof on a map corresponding to a geographic area served by the distribution and/or collection system, and wherein the representation of the distribution and/or collection system includes one or more representations of a geographic location, a geographic feature or a political boundary, or a combination thereof.

14. The computer-readable storage medium of claim 12 further comprising:
   causing the computer to receive an information request from the user;
   causing the computer to retrieve the information requested from the database of information representing the operating state of the elements of the distribution and/or collection system; and
   causing the computer to modify the representation of the elements and configuration of the distribution and/or collection system to emphasize the retrieved information.

15. The computer-readable storage medium of claim 14 wherein the causing the computer to modify the representation to emphasize the retrieved information includes:
   causing the computer to dim the representation of the elements and configuration of the distribution and/or collection system other than for the retrieved information; or
   causing the computer to highlight the retrieved information in the representation of the elements and configuration of the distribution and/or collection system; or
   causing the computer to highlight the retrieved information in the representation of the elements and configuration of the distribution and/or collection system and to dim the representation of the elements and configuration of the distribution and/or collection system other than for the retrieved information.

\* \* \* \* \*